(12) United States Patent
Kim

(10) Patent No.: US 10,916,069 B2
(45) Date of Patent: Feb. 9, 2021

(54) METHOD AND APPARATUS FOR OPERATING PARKING SPACE FOR AUTONOMOUS SMART CAR

(71) Applicants: HANCOM, INC., Seongnam-si (KR); Sang Cheol Kim, Namyangju-si (KR)

(72) Inventor: Sang Cheol Kim, Namyangju-si (KR)

(73) Assignees: HANCOM, INC., Seongnam-si (KR); Sang Cheol Kim, Namyangju-si (KR)

( * ) Notice: Subject to any disclaimer, the term of this patent is extended or adjusted under 35 U.S.C. 154(b) by 331 days.

(21) Appl. No.: 15/573,827

(22) PCT Filed: May 12, 2016

(86) PCT No.: PCT/KR2016/005040
§ 371 (c)(1),
(2) Date: Nov. 13, 2017

(87) PCT Pub. No.: WO2016/186379
PCT Pub. Date: Nov. 24, 2016

(65) Prior Publication Data
US 2018/0261017 A1  Sep. 13, 2018

(30) Foreign Application Priority Data

May 15, 2015 (KR) .................. 10-2015-0068210

(51) Int. Cl.
*G07B 15/02* (2011.01)
*G06Q 10/02* (2012.01)
(Continued)

(52) U.S. Cl.
CPC ............ *G07B 15/02* (2013.01); *B60W 30/06* (2013.01); *G05D 1/0027* (2013.01); *G05D 1/028* (2013.01);
(Continued)

(58) Field of Classification Search
CPC .............................. G06Q 10/02; G06Q 50/30
See application file for complete search history.

(56) References Cited

U.S. PATENT DOCUMENTS

2013/0226627 A1* 8/2013 Kubovcik ............ G06Q 10/02
 705/5
2015/0073645 A1* 3/2015 Davidsson ............ B60W 30/06
 701/23
(Continued)

FOREIGN PATENT DOCUMENTS

JP 2008-242555 A 10/2008
KR 10-0811176 B1 3/2008
(Continued)

OTHER PUBLICATIONS

Patents; "method and arrangement for pick-up point retrieval timing" in patent application approval process. (Apr. 2, 2015). Politics & Government Week Retrieved from https://dialog.proquest.com/professional/docview/1666849461?accountid=131444 (Year: 2015).*
(Continued)

*Primary Examiner* — Kevin H Flynn
*Assistant Examiner* — Michelle E Carey
(74) *Attorney, Agent, or Firm* — Revolution IP, PLLC

(57) ABSTRACT

A parking space operating apparatus for an autonomous smart car controls a plurality of autonomous smart cars that are autonomously and remotely controlled and a plurality of parking space servers of parking spaces providing various services including car washing, maintenance, and charging to the autonomous smart cars in a smart parking space where the autonomous smart cars are parked, wherein the apparatus communicates with a financial institution server to automatically execute payment of a parking fee of the autonomous smart car when using a parking space service or leaving a parking space, when the autonomous smart car requests parking, the autonomous smart car is remotely controlled to be guided to one of a plurality of parking spaces that is selected based on a current location and a schedule of the (Continued)

autonomous smart car, and a condition of the autonomous smart car is identified to provide the service.

7 Claims, 2 Drawing Sheets

(51) Int. Cl.
*B60W 30/06* (2006.01)
*G06Q 20/00* (2012.01)
*G06Q 50/30* (2012.01)
*G06Q 20/14* (2012.01)
*G06Q 10/10* (2012.01)
*G05D 1/00* (2006.01)
*G05D 1/02* (2020.01)

(52) U.S. Cl.
CPC ........... *G05D 1/0291* (2013.01); *G06Q 10/02* (2013.01); *G06Q 10/10* (2013.01); *G06Q 20/00* (2013.01); *G06Q 20/14* (2013.01); *G06Q 50/30* (2013.01); *B60K 2370/175* (2019.05); *B60W 2556/45* (2020.02); *G05D 2201/0213* (2013.01); *G06Q 2240/00* (2013.01)

(56) References Cited

U.S. PATENT DOCUMENTS

| | | | | |
|---|---|---|---|---|
| 2015/0161578 A1* | 6/2015 | Ahmed | ................... | G07F 17/24 705/40 |
| 2016/0035001 A1* | 2/2016 | Driscoll | ............. | G06Q 30/0631 705/26.7 |
| 2016/0180712 A1* | 6/2016 | Rosen | ................ | G01C 21/3685 705/5 |
| 2016/0203649 A1* | 7/2016 | Berkobin | ............... | G06Q 20/12 705/13 |

FOREIGN PATENT DOCUMENTS

| | | |
|---|---|---|
| KR | 10-1248621 B1 | 4/2013 |
| KR | 10-2015-0000747 A | 1/2015 |
| KR | 10-2015-0020738 A | 2/2015 |

OTHER PUBLICATIONS

International Search Report for PCT/KR2016/005040 dated Aug. 17, 2016 from Korean Intellectual Property Office.

\* cited by examiner

METHOD AND APPARATUS FOR OPERATING PARKING SPACE FOR AUTONOMOUS SMART CAR

CROSS REFERENCE TO PRIOR APPLICATIONS

This application is a National Stage Application of PCT International Patent Application No. PCT/KR2016/005040 filed on May 12, 2016, under 35 U.S.C. § 371, which claims priority to Korean Patent Application No. 10-2015-0068210 filed on May 15, 2015, which are all hereby incorporated by reference in their entirety.

TECHNICAL FIELD

The present invention relates to a method and apparatus for operating parking space for autonomous smart car. More particularly, the present invention relates to a parking space operating apparatus and method for autonomous smart cars, the apparatus and method being capable of solving parking problems as well as providing various services.

BACKGROUND ART

Recently, as image processing-related technologies and performances of sensors and hardware, etc. have rapidly developed, research on unmanned cars is competitively proceeding.

Actually, a GPS navigation device has already been popularized as a navigation service for drivers. Also, accuracy of GPS data has been gradually improved, and reliability has increased due to small error range.

The newest unmanned cars autonomously drive and park by utilizing a camera for observing forward and backward, a front-side radar sensor, the GPS, etc.

Since unmanned cars are an inevitable trend, research thereon has been conducted in various directions, but until now, they have been studied mainly only on unmanned driving of cars.

DISCLOSURE

Technical Problem

Accordingly, the present invention has been made keeping in mind the above problems occurring in the related art, and an object of the present invention is to provide a parking space operating apparatus and method for autonomous smart cars, the apparatus and method being capable of solving parking problems as well as providing various services for autonomous smart cars that are remote-controllable.

Technical Solution

In order to accomplish the above object, the present invention provides a parking space operating apparatus for an autonomous smart car, the apparatus controlling: a plurality of autonomous smart cars that are autonomously and remotely controlled and a plurality of parking space servers of parking spaces providing various services including car washing, maintenance, and charging to the autonomous smart cars in a smart parking space where the autonomous smart cars are parked, wherein the apparatus communicates with a financial institution server to automatically execute payment of a parking fee of the autonomous smart car when using a parking space service or leaving a parking space, and when the autonomous smart car requests parking, the autonomous smart car is remotely controlled to be guided to one of a plurality of parking spaces that is selected based on a current location and a schedule of the autonomous smart car, and a condition of the autonomous smart car is identified to provide the service.

Here, the plurality of parking space servers may perform parking in compliance with a request of the parking space operating apparatus for the autonomous smart car for parking the autonomous smart car through a communication network, and may provide the various services required by the parked autonomous smart car through communication with the parking space operating apparatus for the autonomous smart car via the communication network.

Also, the parking space operating apparatus for autonomous smart cars may include: a communication unit providing communication with the financial institution server, the autonomous smart car, and the parking space server; a database storing information on a customer of the autonomous smart car, information on a plurality of parking spaces, and reservation information on the parking spaces of the plurality of autonomous smart cars; a schedule setting unit receiving information on a current location of the autonomous smart car and information on a customer schedule in response to a parking service request of the plurality of autonomous smart cars and setting a schedule so as to park at one parking space of the plurality of parking spaces; an encryption unit protecting data of the parking space operating apparatus for the autonomous smart car through encryption of data being input and output through the communication unit and supporting encryption for data when communicating with the financial institution server, the autonomous smart car, and the parking space server; and a controller controlling the communication unit, the database, the schedule setting unit, and the encryption unit such that when the autonomous smart car requests parking, the autonomous smart car is guided to a parking space based on the current location of the autonomous smart car and the customer schedule through communication with the plurality of parking space servers, the controlling handling a request of the parking space server for providing a service required for the parked autonomous smart car and executing payment through communication with the financial institution server when the autonomous smart car leaves the parking space or uses the service.

In the meantime, the database may include: a customer information DB storing at least one of a customer name, a residential/workplace address, a customer terminal contact number, customer preference information, autonomous smart car model information, parking space record information, a customer schedule of a customer of each of the plurality of autonomous smart cars; a parking space information DB storing parking space service facility information including parking space locations, car washing, maintenance, and charging of the plurality of parking spaces and storing parking space amenity information including at least one piece of information on a dry cleaner, a convenience store, and a shower facility; and a reservation information DB storing reservation information on the plurality of parking spaces of the plurality of autonomous smart cars.

Also, in order to accomplish the above object, the present invention provides a parking space processing server for an autonomous smart car, the server including: a communication unit providing communication with a financial institution server, a autonomous smart car, and a parking space server; a database storing information on a customer of the autonomous smart car, information on a plurality of parking spaces, and reservation information on the parking spaces of a plurality of autonomous smart cars; a schedule setting unit receiving information on a current location of the autonomous smart car and information on a customer schedule in response to a parking service request of the plurality of autonomous smart cars and setting a schedule so as to park at one parking space of the plurality of parking spaces; an encryption unit protecting data of a parking space operating apparatus for the autonomous smart car through encryption of data being input and output through the communication unit and supporting encryption for data when communicating with the financial institution server, the autonomous smart car, and the parking space server; and a controller controlling the communication unit, the database, the schedule setting unit, and the encryption unit such that when the autonomous smart car requests parking, the autonomous smart car is guided to a parking space based on the current location of the autonomous smart car and the customer schedule through communication with a plurality of parking space servers, the controlling handling a request of the parking space server for providing a service required for the parked autonomous smart car and executing payment through communication with the financial institution server when the autonomous smart car leaves the parking space or uses the service.

Also, in order to accomplish the above object, the present invention provides a parking space operating method for an autonomous smart car, the method including: building, by a parking space operating apparatus for an autonomous smart car, a database of information on a parking space through communication with a parking space server; building, by the parking space operating apparatus for the autonomous smart car, a database of customer information of the autonomous smart car by receiving the customer information through a customer terminal of the autonomous smart car; identifying, by the parking space operating apparatus for the autonomous smart car, a customer request and a customer schedule through the autonomous smart car or the customer terminal when receiving a request for a parking space reservation from the autonomous smart car; searching, by the parking space operating apparatus for the autonomous smart car, for a parking space based on the customer schedule to guide through communication with the parking space server and making a reservation through communication with a relevant parking space server; controlling, by the parking space operating apparatus for the autonomous smart car, the autonomous smart car to autonomously drive to the reserved parking space and to park; and reporting, by the relevant parking space server, a situation through communication with the parking space operating apparatus for the autonomous smart car via a communication network when the autonomous smart car enters the parking space.

Here, the parking space information may include information on car washing, maintenance, and charging facilities, information on various amenities including a dry cleaner, a convenience store, a shower facility, and communication path setting with each parking space server.

Also, the customer information may include at least one of a customer name, a residential/workplace address, a contact number, customer preference information, autonomous smart car model information of the customer, parking space record information, and a customer schedule.

Also, the method may further include: identifying, by the parking space server after parking the autonomous smart car, the customer request to provide a service, or identifying a condition of the autonomous smart car through inspection to report the service to the parking space operating apparatus for the autonomous smart car; providing the service by identifying a schedule of the parking space when the customer terminal or the autonomous smart car requests the service; and communicating, by the parking space operating apparatus for the autonomous smart car, with a financial institution server to execute payment of a fee for the service when the autonomous smart car leaves the parking space or the service is provided.

Advantageous Effects

According to the present invention, the following effects may be obtained.

First, even though autonomous smart cars that are remote-controllable are not in use, the autonomous smart cars can be parked in parking spaces near residences, thereby solving parking problems.

Second, customers enable autonomous smart cars to be autonomously parked in parking spaces anywhere, and thus it is convenient to park.

Third, it is possible to perform remote parking, and thus accidents that may occur in parking spaces can be prevented.

Fourth, the autonomous smart car can be moved to the parking space through remote control to receive maintenance, and thus the customer can receive car maintenance without wasting time.

Fifth, in a case of autonomous smart cars being used where people live, various amenities in parking spaces can be easily used by customers, and such amenities can be useful in places where people take holidays or business trips.

BEST MODE

Exemplary embodiments of the present invention will be described in detail with reference to the accompanying drawings.

Also, all terms used herein should be construed as having meanings that are obvious to one of ordinary skill in the art. However, some terms may be arbitrarily selected by the applicant, and in this case, the meaning of the selected terms will be described in detail in the detailed description of the present invention. Thus, the terms used herein should be defined based on the meaning of the terms together with the description throughout the specification. Also, detailed description of well-known functions and structures incorporated herein may be omitted to avoid obscuring the subject matter of the present invention. This aims to omit unnecessary description so as to make the subject matter of the present invention clear.

Figure 1:
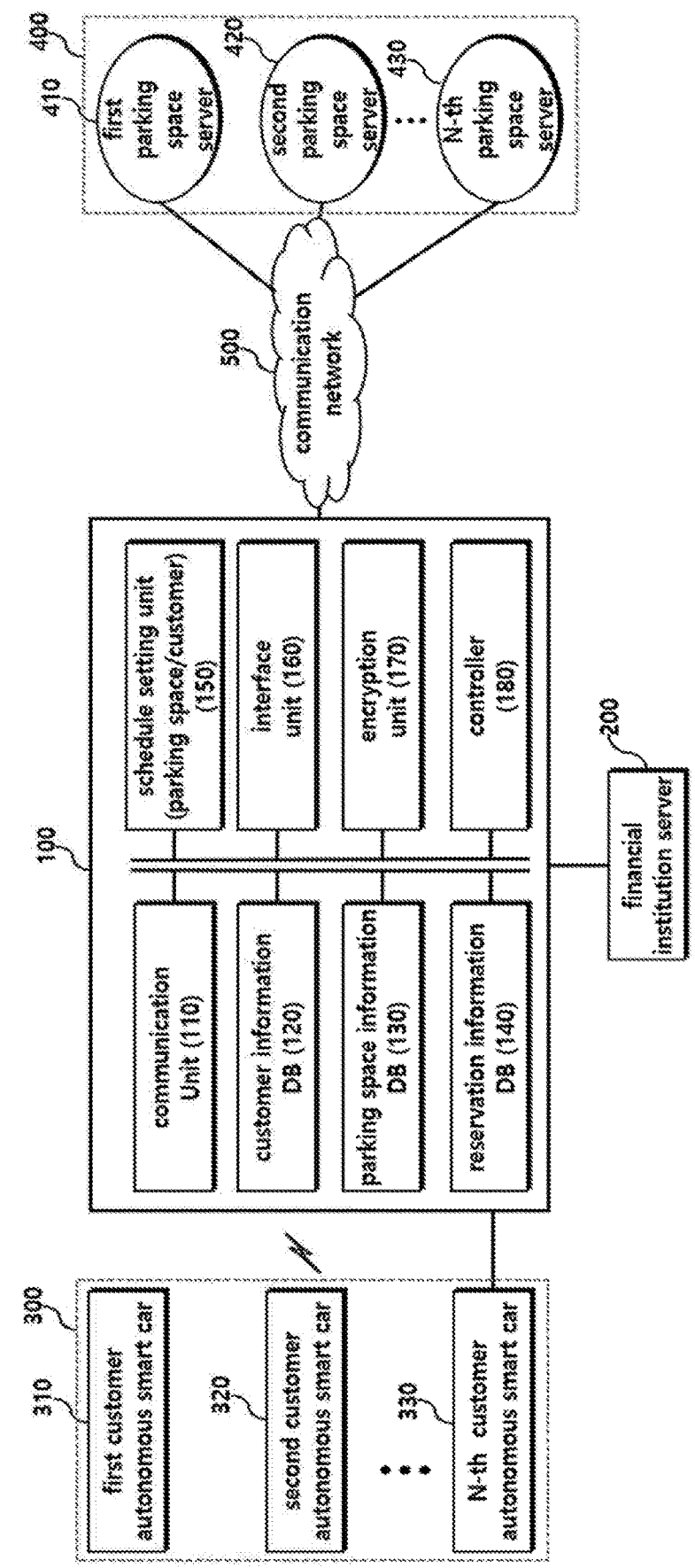
FIG. 1 is a block diagram illustrating a parking space operating apparatus for autonomous smart cars according to the present invention.

FIG. 1 is a block diagram illustrating a parking space operating apparatus for autonomous smart cars according to the present invention.

A parking space operating apparatus 100 for autonomous smart cars according to the present invention controls: a plurality of autonomous smart cars 310, 320, and 330: 300 that are autonomously and remotely controlled; a plurality of parking space servers 410, 420, 430: 400 of parking spaces providing various services including car washing, maintenance, and charging in a smart parking space where the autonomous smart cars 300 are parked; and a financial institution server 200 automatically executing payment for a parking fee of the autonomous smart car 300 when using a parking space service or leaving a parking space. When the autonomous smart car 300 requests parking, the autonomous smart car 300 is remotely controlled to be guided to one of a plurality of parking spaces that is selected based on a current location and a schedule of the autonomous smart car 300. A condition of the autonomous smart car 300 is identified to provide a service.

The financial institution server 200 is a server of a financial institution for stable financial transactions between customers and sellers.

Through the parking space server 400, parking is performed in compliance with a request of the parking space operating apparatus 100 for parking the autonomous smart car 300. Various services required by the parked autonomous smart car 300 are provided to the autonomous smart car 300 by communicating with the parking space operating apparatus 100 for autonomous smart cars through a communication network 500.

The parking space operating apparatus 100 for autonomous smart cars is composed of a communication unit 110, a customer information database (DB) 120, a parking space information DB 130, a reservation information DB 140, a schedule setting unit 150, an interface unit 160, an encryption unit 170, and a controller 180.

The communication unit 110 provides communication with the financial institution server 200, the autonomous smart car 300, and the parking space server 400.

The customer information DB 120 stores information on customers of the first to N-th autonomous smart cars 310, 320, and 330. The customer information includes a customer name, a residential/workplace address, a contact number, customer preference information, autonomous smart car model information of a customer, parking space record information, a customer schedule, etc.

The parking space information DB 130 stores information on the first to the N-th parking spaces 410, 420, and 430. As parking space information, parking space service facility information including information on a parking space location, car washing, maintenance, and charging, and parking space amenity information including information on a dry cleaner, a convenience store, a shower facility, etc. are stored.

The reservation information DB 140 stores reservation information on a plurality of parking spaces 400 of a plurality of autonomous smart cars 300.

The schedule setting unit 150 receives information on current locations of a plurality of autonomous smart cars 300 and information on a customer schedule in response to parking service requests of the plurality of autonomous smart cars 300, and sets a schedule so as to park at the optimum parking space among a plurality of parking spaces 400.

The interface unit 160 is connected to a mouse, a keyboard, a printer, a monitor, etc. that access the parking space operating apparatus 100 for autonomous smart cars.

The encryption unit 170 protects data of the parking space operating apparatus 100 for autonomous smart cars through encryption of data being input and output through the communication unit 110 or the interface unit 160, and supports encryption for data when communicating with the financial institution server 200, the autonomous smart car 300, and the parking space server 400.

The controller 180 controls the communication unit 110, the customer information database (DB) 120, the parking space information DB 130, the reservation information DB 140, the schedule setting unit 150, the interface unit 160, and the encryption unit 170 such that when the autonomous smart car 300 requests parking, the autonomous smart car 300 is guided to the optimum parking space based on the current location of the autonomous smart car 300 and the customer schedule through communication with the plurality of parking space servers 400. Also, the controller 180 handles a request of the parking space server 400 for providing a service required for the parked autonomous smart car 300, and executes payment through communication with the financial institution server 200 when the autonomous smart car 100 leaves the parking space or uses a service.

The parking space operating apparatus 100 for autonomous smart cars may be realized as a server.

Figure 2:
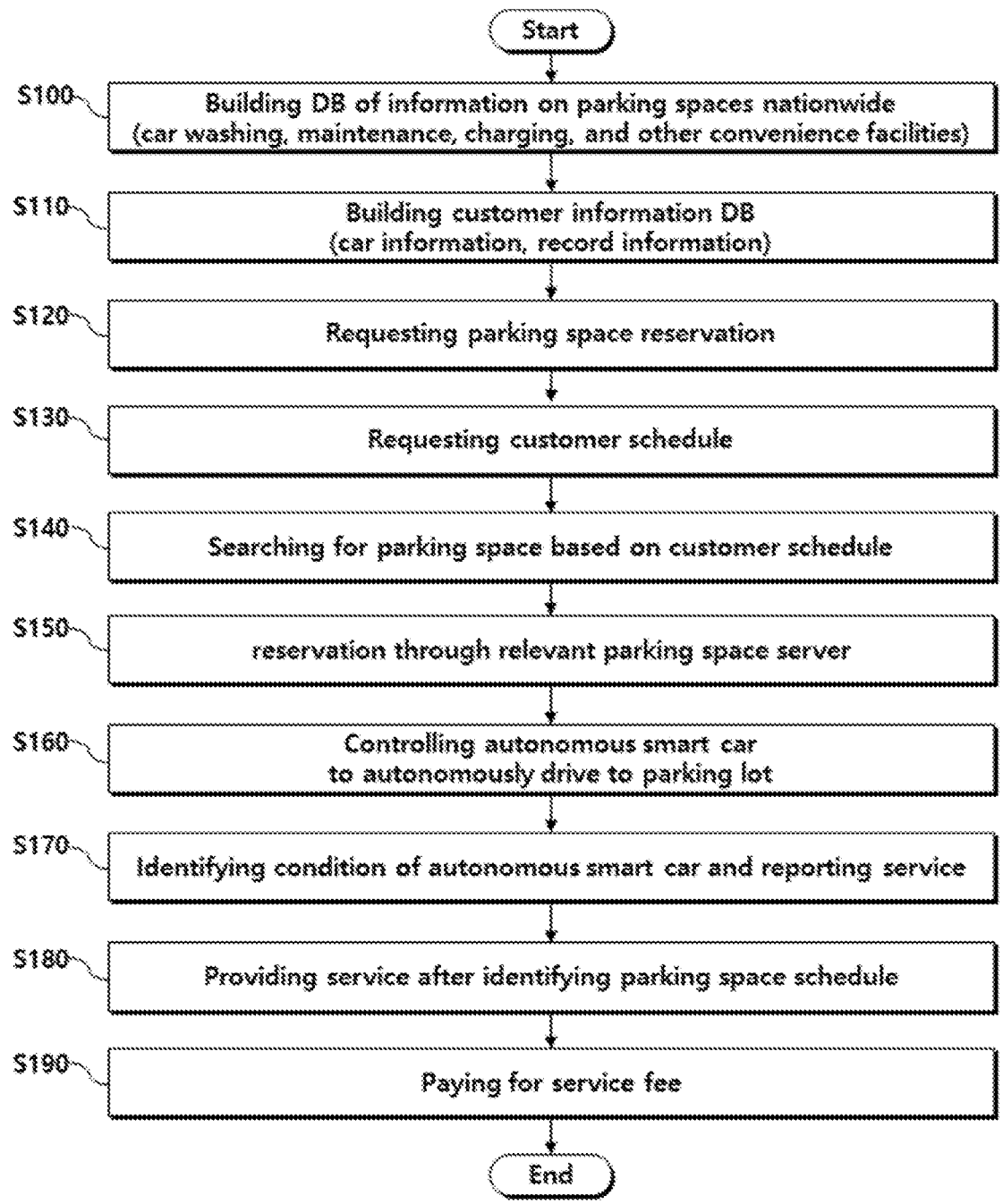
FIG. 2 is a flowchart illustrating a parking space operating method for autonomous smart cars according to the present invention.

FIG. 2 is a flowchart illustrating a parking space operating method for autonomous smart cars according to the present invention.

In the parking space operating method for autonomous smart cars according to the present invention, as shown in FIG. 2, the parking space operating apparatus 100 for autonomous smart cars builds a database of information on parking spaces nationwide at step S100. The parking space information includes: information on car washing, maintenance, and charging; information on various amenities such as a dry cleaner, a convenience store, a shower facility, etc.; and a communication path setting with each parking space server 400. Such the information is stored in the parking space information DB 130.

Next, the parking space operating apparatus 100 for autonomous smart cars builds the customer information DB. The customer information includes a customer name, a residential/workplace address, a customer terminal contact number, customer preference information, autonomous smart car model information of a customer, parking space record information, a customer schedule, etc. Through the customer information DB, it is possible to provide a stable parking service to the customer and the autonomous smart car 300 of the customer. The customer information is stored in the customer information DB 120.

Next, the parking space operating apparatus 100 for autonomous smart cars receives a request for a parking space reservation from the autonomous smart car 300 or the customer terminal at step S120, and identifies a customer request and a customer schedule at step S130. The customer request may be just parking, or services such as car washing, maintenance, charging, etc. in addition to parking. The schedule may include whether a customer is in the parking space with an autonomous smart car or in a different location, and a next destination when the customer is together with an autonomous smart car. Accordingly, the customer can be guided to the most suitable parking space based on the request and the schedule.

Based on the schedule, the parking space operating apparatus 100 for autonomous smart cars searches for the optimum parking space through communication with the parking space server 400 at step S140. Here, the schedule setting unit 150 sets a schedule of the parking space with the customer to search for the optimum parking space.

Next, the parking space operating apparatus 100 for autonomous smart cars makes a reservation through communication with the relevant parking space server 400 at step S150. The reservation information is stored in the reservation information DB 140.

At the time when parking is actually requested, the parking space operating apparatus 100 for autonomous smart cars controls the autonomous smart car 300 to autonomously drive to the reserved parking space and to park at step S160.

In the meantime, when the autonomous smart car 300 enters the parking space, the parking space server 400 reports the situation through communication with the parking space operating apparatus 100 for autonomous smart cars via the communication network 500, and identifies the customer request to provide a service, or identifies a condition of the autonomous smart car 300 through inspection to report a service at step S170. Then, the parking space operating apparatus 100 for autonomous smart cars reports the situation to the customer terminal or the autonomous smart car 300 based on the customer contact number of the customer information DB.

When the customer terminal or the autonomous smart car 300 requests the service, the schedule of the parking space is identified to provide the service at step S180.

Next, when the car leaves the parking space or a service is provided, the parking space operating apparatus 100 for autonomous smart cars communicates with the financial institution server 200 to execute payment of a fee for the service.

Although the present invention has been described with reference to the accompanying drawings, this is merely an example of various embodiments containing the subject matter of the present invention, and is intended to allow those skilled in the art to easily implement the present invention. Thus, it is clear that the present invention is not restricted to the embodiments described above. Therefore, the scope of the present invention should be construed by claims below, and all technical spirits that fall within an equivalent range by change, substitution, replacement, etc. within the subject matter of the present invention will be included in the scope of a right of the present invention. In addition, some components of the drawings are intended to more clearly describe configurations, and thus it is clarified that the components are exaggerated or minimized when compared to actual components.

INDUSTRIAL APPLICABILITY

The present invention can solve parking problems of autonomous smart cars as well as can provide various services, and can be used in a technology of operating parking spaces for autonomous smart cars.

The invention claimed is:

1. A parking space operating apparatus for an autonomous smart car, the apparatus controlling:
at least one or more units, the one or more units being communicated and executed by a controller of a server using an algorithm associated with at least one computer-readable non-transitory storage device, the units comprising, a communication unit configured to provide communication with a financial institution server, an autonomous smart car, and a parking space server;
a schedule setting unit configured to receive information on a current location of the autonomous smart car and information on a customer schedule in response to detection of a parking service request of each of a plurality of autonomous smart cars;
an encryption unit configured to protect data of the parking space operating apparatus for the autonomous smart car through encryption of data being input and output through the communication unit and to provide encryption data when communicating with the financial institution server, the autonomous smart car, and the parking space server;
a database configured to store information on a customer of the autonomous smart car, information on a plurality of parking spaces, and reservation information on parking spaces of a plurality of autonomous smart cars;
in response to detection of a parking service request of the plurality of autonomous smart cars, the schedule setting unit configured to receive information on a current location of an autonomous smart car and information on a customer schedule;
in response to detection of a communication signal with the financial institution server, the autonomous smart car, and the parking space server, the encryption unit configured to protect data of the parking space operating apparatus for the autonomous smart car through encryption of data being input and output through the communication unit and to provide encryption data;
and the controller configured to control the communication unit, the database, the schedule setting unit, and the encryption unit and in response to detection of the autonomous smart car parking request, the autonomous smart car is guided to a parking space based on the current location of the autonomous smart car and the customer schedule through communication with the parking space server, the control including handling a request of the parking space server for searching the parking space and providing a service required for the parked autonomous smart car and executing payment through communication with the financial institution server when the autonomous smart car leaves the parking space or uses the service, wherein
a plurality of autonomous smart cars that are autonomously and remotely controlled to be guided to the parking space and the parking space server of parking spaces providing services including car washing, maintenance, and charging to the autonomous smart cars in a smart parking space in response to detection of the autonomous smart car being guided to the parking space and parked,
wherein in response to detection of the autonomous car using a parking space or leaving a parking space, the parking space operating apparatus communicates with a financial institution server to automatically execute payment of a parking fee of the autonomous smart car,
in response to detection of the autonomous smart car parking requests, the autonomous smart car is remotely controlled to be guided to one of the plurality of parking spaces that is selected based on a current location and a schedule of the autonomous smart car, and
a condition of the autonomous smart car is identified.

2. The apparatus of claim 1, wherein the parking space server performs parking in compliance with a request of the parking space operating apparatus for the autonomous smart car for parking the autonomous smart car through a communication network, through communication with the parking space operating apparatus for the autonomous smart car via the communication network.

3. The apparatus of claim 1, wherein the database includes:
a customer information database configured to store at least one of a customer name, a residential/workplace address, a customer terminal contact number, customer preference information, autonomous smart car model information, parking space record information, a customer schedule of a customer of each of the plurality of autonomous smart cars;

a parking space information database configured to store parking space service facility information including parking space locations, car washing, maintenance, and charging of the plurality of parking spaces and storing parking space amenity information including at least one piece of information on a dry cleaner, a convenience store, and a shower facility;

and a reservation information database configured to store reservation information on the plurality of parking spaces of the plurality of autonomous smart cars.

4. A computer-implemented parking space operating method for an autonomous smart car, the method comprising:

providing communication with a financial institution server, an autonomous smart car, and a parking space server;

receiving information on a current location of the autonomous smart car and information on a customer schedule in response to detection of a parking service request of the plurality of autonomous smart cars;

protecting data of a parking space operating apparatus for the autonomous smart car through encryption of data being input and output by providing encryption data when communicating with the financial institution server, the autonomous smart car, and the parking space server;

storing information on a customer of the autonomous smart car, information on a plurality of parking spaces, and reservation information on parking spaces of a plurality of autonomous smart cars;

in response to detection of a parking service request of the plurality of autonomous smart cars, receiving a current location of the autonomous smart car and information on a customer schedule and setting a schedule so as to park at one parking space of the plurality of parking spaces;

in response to detection of a communication signal with the financial institution server, protecting data of the parking space operating apparatus for the autonomous smart car through encryption of data being input and output by providing encryption data;

and the autonomous smart car is guided to a parking space based on a current location of the autonomous smart car and a customer schedule through communication with the parking space server, and handling a request of the parking space server for searching the parking space and providing a service required for the parked autonomous smart car and executing payment through communication with the financial institution server when the autonomous smart car leaves the parking space or uses the service, wherein a plurality of autonomous smart cars are autonomously and remotely controlled to be guided to the parking space and the parking space server of parking spaces providing various services including car washing, maintenance, and charging to the autonomous smart cars in a smart parking space in response to detection of the autonomous smart car being guided to the parking space and parked, wherein in response to detection of the autonomous smart car using a parking space or leaving a parking space, communicating with the financial institution server to automatically execute payment of a parking fee of the autonomous smart car, in response to detection of the autonomous smart car parking requests, remotely controlling the autonomous smart car to be guided to one of a plurality of parking spaces that is selected based on a current location and a schedule of the autonomous smart car, and a condition of the autonomous smart car is identified.

5. The method of claim 4, wherein the information on a plurality of parking spaces includes information on car washing, maintenance, and charging facilities, information on various amenities including a dry cleaner, a convenience store, a shower facility, and communication with the parking space server.

6. The method of claim 4, wherein the customer information includes at least one of a customer name, a residential/workplace address, a contact number, customer preference information, autonomous smart car model information of the customer, parking space record information, and a customer schedule.

7. The method of claim 4, further comprising:

identifying, by the parking space server subsequent to detection of parking the autonomous smart car, a customer request to provide a service for the autonomous smart car;

providing the service by identifying a schedule of the parking space in response to detection of the customer request;

and communicating, by the parking space operating apparatus for the autonomous smart car, with a financial institution server to execute payment of a fee for the service in response to detection of the autonomous smart car leaving the parking space or the service being provided.

* * * * *